2,925,366

MANUFACTURE OF 17-ALPHA STEROIDS BY GENUS TRICHOTHECIUM

Herbert C. Murray, Barry Township, Barry County, and Peter D. Meister, Kalamazoo Township, Kalamazoo County, Mich., assignors to The Upjohn Company, Kalamazoo, Mich., a corporation of Michigan No Drawing. Application August 9, 1957
Serial No. 677,234

21 Claims. (Cl. 195—51)

This invention relates to a process for the fermentative production of oxygenated steroids. More particularly it relates to a process of oxygenating a steroid by the action of a species of fungus of the genus Trichothecium.

This application is a continuation-in-part of application S.N. 435,064, filed June 7, 1954, now abandoned.

It is an object of this invention to provide a novel method for the introduction of oxygen into a steroid molecule, thus producing valuable compounds having pharmaceutical activity and intermediates therefor. Another object is the provision of a process for the production of 17-hydroxylsteroids. A further object is to provide a process of 11-hydroxylating steroids. Other objects will be apparent to those skilled in the art to which this invention pertains.

The method of the present invention involves aerobically subjecting a steroid to the oxygenating action of a species of fungus of the genus Trichothecium to hydroxylate a steroid. Hydroxylation occurs chiefly in the 17-position; however, the 11-position may become hydroxylated, or concomitantly, several oxygenations may also take place, for example, the 11- and 17-positions may both be hydroxylated in a single step.

The steroids operative in the method of the present invention for the introduction of the hydroxyl group are not limited as to type or number of substituents. The essential requisite for operativeness in the present process for 17-hydroxylation is that the starting steroid must contain a hydrogen, replaceable or substitutable group attached to the 17-position, for example, a tertiary hydrogen atom attached to the 17-position carbon atom. Such compounds contain the nucleus:

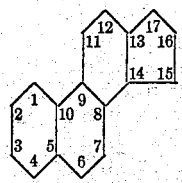

which may contain substituents or combinations of substituents about the nucleus in each of the positions from 1 through 16 inclusively, especially 10-methyl, 13-methyl and 10,13-dimethyl groups. Double bonds may be present in the 1, 4, 5, 6, 7, 8, 9(11), 11(12), 16(17), 17(20) and/or other positions, or the double bonds may be substituted by the addition of halogen or hydrogen halide. Particularly valuable starting steroids are those having up to and including 22 carbon atoms in the carbon to carbon skeleton and more especially those having a 20-keto group. Where the 17-position is unoxygenated or oxygenatable, hydroxylation at 17 is accomplished. However, an unoxygenated or oxygenatable 11-position is similarly amenable to oxygenation or hydroxylation. Illustrative 17-position side chains of special interest are —COCH$_3$, —COCH$_2$OH, and —COCH$_2$OAc where Ac is an acyl radical. Suitably, the acyl radical may be carboxylic, the length of the acyl side chain being non-critical, although one to nine carbon atom carboxylic acids are usually utilized. The 21-acetate is a practical example of a suitable ester.

The biological oxygenation is achieved by a species of fungus of the genus Trichothecium. Bessey, E. A., "Morphology and Taxonomy of Fungi," pages 589 and 615, Blakiston, Philadelphia, 1950, describes the closely related Cephalothecium as possessing conidia in the form of heads whereas in Trichothecium the conidia are single at the tip of the conidiophore. Both Cephalothecium and Trichothecium produce somewhat pear-shaped hyaline or pale pink spores that are two-celled, the basal cell being smaller than the terminal cell. The genera Cephalothecium and Trichothecium are often considered synonymous in the art, and as used in the specification and claims the genus Trichothecium encompasses the genus Cephalothecium. The genus Trichothecium (Cephalothecium) is of the family Hyalodidymous Moniliaceae of the family Hyalodidymae of the order Moniliales. Among the species of the genera useful in the oxygenation of steroids are mentioned:

*Cephalothecium roseum* ATCC 8685,
*Trichothecium arrhenopum,*
*Trichothecium candidum,*
*Trichothecium roseum* NRRL 1665,
*Trichothecium plasmoparae,* and
*Trichothecium polybrochum.*

The following public repositories list as available cultures of typical strains of Trichothecium (Cephalothecium) useful in the practice of this invention. The cultures currently listed by each of the two repositories are also given for the sake of convenience.

American Type Culture Collection:
  *Cephalothecium roseum* 8685, (*Trichothecium roseum*) K. B. Raper, NRRL, Strain 1665

Centraalbureau voor Schimmelcultures at Baarn, Holland:
  *Trichothecium luteum* Petch, Strain Boedijn and Reitsma
  *Trichothecium domesticum* Fr.
  *Trichothecium roseum* Link
  *Trichothecium roseum* Link (with pseudoverticillium form)
  *Trichothecium cystosporium* Duddington, Duddington strain
  *Trichothecium roseum* Link, Cain strain Culture of the fungi for the purpose and practice of this invention may be on any medium, liquid or solid, favorable to the growth of the fungi, in accordance with procedures recognized in the art or as shown in United States Patent 2,602,769. While solid media may be used, liquid media are well adapted to use under aerobic layer or the preferred aerobic submerged fermentation conditions. Suitably the media should contain sources of available carbon, nitrogen and minerals although of course there can be significant growth and development under less than optimum conditions.

Available carbon may be carbohydrates, starches, gelatinized starches, dextrins, sugars, molasses of cane, beet or sorghum, glucose, fructose, mannose, galactose, maltose, sucrose, lactose or pentoses. Amino acids, peptones, proteins, glycerol, acetic acid, sodium acetate, citric acid, sodium citrate, lower fatty acids, higher fatty acids, soaps, or fats are illustrative of other materials which provide assimilable carbon for the energy and growth requirements of the fungi. Mixtures of various carbon sources are sometimes advantageous for balanced growth.

Nitrogen in assimilable form may be provided by soluble or insoluble vegetable or animal protein, soybean meal, lactalbumin, casein, egg albumin, whey, distillers' solubles, corn steep liquor, yeast extract, peptones, polypeptides, amino acids, ammonium salts for example ammonium tartrate or ammonium sulfate, nitrates for example sodium or ammonium nitrate, or acetamide.

As mineral constituents the medium may contain, either concomitantly present or added, available calcium, cobalt, gallium, iron, magnesium, molybdenum, and potassium. Sulfur may be provided by sulfates, alkyl sulfonates, sulfides, free sulfur or cystine, thiamine or biotin. Phosphorus, particularly in a concentration at or about 0.001 to 0.07 and preferably 0.015 to 0.12 molar, may be present as ortho-, meta-, or pyrophosphates, salts or esters, phytin, phytate, glycerophosphate, sodium nucleinate, or casein. Boron and iodine in traces are sometimes desirable.

Other accessory growth factors, vitamins, auxins and growth stimulants may be provided as needed or desired.

Carbohydrate and fat are not essential for the growth of Trichothecium but carbohydrate provides an economical energy source for the fungi. Amino acids or proteins, separately or together, are desirable for aiding completion of the life cycle of the fungi.

Suspension agents, mycelial carriers or emulsifying agents such as filter earths, filter aids, finely divided cellulose, wood chips, bentonite, calcium carbonate, magnesium carbonate, charcoal, activated carbon or other suspendable solid matter, methyl cellulose, carboxymethyl cellulose or alginates may be added to facilitate fermentation, aeration and filtration.

The selected species of fungus of the genus Trichothecium may be suitably grown in a medium containing available carbon, illustratively carbohydrate such as a sugar or starch; assimilable nitrogen, illustratively protein, and utilizable mineral constituents preferably including zinc, magnesium and phosphates. The pH of the medium is not especially critical as long as growth occurs, although acid conditions may be desirable to inhibit bacterial contamination. Microbiological contamination may be retarded or prevented by the presence of antiseptic or antibiotic agents such as, for example, benzoates, sulfites, penicillin, circulin or neomycin.

Inoculation of the fungal growth-supporting medium with the selected fungus of the genus Trichothecium may be accomplished in any suitable manner. Trichothecia grow well at a temperature of about twenty degrees centigrade and growth of the fungi is readily promoted by maintaining an incubation temperature of about fifteen to thirty degrees centrigrade; however, lower or higher temperatures not greater than about fifty degrees centigrade are also operative.

The steroid may be added either before thermal or other sterilization of the medium, before or at the time of inoculating the medium with Trichothecium, or later, for example, after a 24 to 48 hour growth period. The steroid to be oxygenated may be added at any desired concentration although a concentration of more than two grams of steroid per liter of medium, depending upon the steroid, retards but does not prevent mycelial development. The addition of steroid substrate to be fermented may be accomplished in any suitable manner especially so as to promote a large surface of contact of steroid substrate with the oxygenating activity of the fungus, such as by dispersing the steroid substrate, either alone, with a dispersing agent, or in solution in a water-miscible organic solvent, by mixing or homogenizing the steroid substrate with the fungal medium to form a suspension or dispersion of steroid. Either surface or the preferred submerged culture procedures may be used with facility. Alternatively, steroid fermenting enzymes of a growth of fungus may be separated from the fungus or medium, admixed with the steroid or a solution or dispersion thereof, and the mixture subjected to aerobic conditions to accomplish fermentation of the steroid.

The temperature during the period of fermentation of the steroid may be the same as that found suitable for fungal growth. It need be maintained only within such range as supports life, active growth, or the enzyme activity of the fungus.

While any form of aerobic incubation is satisfactory for the growth of the selected fungus or fermentation of the steroid substrate, the efficiency of steroid fermentation is related to aeration. Therefore, aeration is usually controlled, as by agitation and/or blowing air through the fermentation medium. Aeration may be effected by surface culture or under submerged fermentation conditions. Aerobic conditions include not only the use of air to introduce oxygen, but also other sources or mixtures containing oxygen in free or liberatable form. A wide range of readily ascertainable rate of aeration is practicable. In using air as the aerating medium, a desirable rate of aeration is about four to twenty millimoles of oxygen per hour per liter as determined by the method of Cooper, Fernstrom and Miller, Ind. Eng. Chem., 36, 504 (1944). Under some conditions it is desirable to utilize different rates of aeration during the fungus growing or developing stage as contrasted with the steroid fermentation stage. Aeration is suitably modified by using superatmospheric or subatmospheric pressures, for example, thirty pounds per square inch or ten pounds per square inch absolute. Oxygen uptake may be facilitated by the presence in the medium of various catalyst such as ascorbic acid, glutamic acid, citric acid, lactic acid, tyrosine, or tryptophane.

The time required for the fermentation of the steroids varies somewhat with the procedure. When the steroid substrate is present at the time of inoculation of the medium, periods of from eight to 72 hours may be used. However, when the steroid is added to the fungus, after substantial aerobic growth of the fungal organism, for example, after sixteen to 24 hours at optimum temperature, the conversion of steroid substrate begins immediately and high yields are obtained in from one to 72 hours, 24 hours being generally satisfactory. The steroids may be fermented in a simultaneous or sequential heterofermentative procedure resulting in other useful products, which are recoverable according to procedures known in the art. These auxiliary fermentation products may be separated from the fermentation beer either at the same time, before or after the fermentation is complete with respect to the steroid fermentation products. Illustratively, fermentation of steroid by means of *Trichothecium roseum* produces oxygenated steroid as well as antibiotics, the antibacterial rosein and the antifungal Trichothecium recoverable by extraction with chloroform or ether followed by chromatography.

After completion of the steroid fermentation, the resulting fermented steroid is recovered from the fermentation reaction mixture. An especially advantageous manner of recovering the fermented steroid involves extracting the fermentation reaction mixture, including the fermentation liquor and mycelia with a water-immiscible organic solvent for steroids, for example, methylene chloride, ethylene chloride, trichloroethylene, ether, amyl acetate, and the like. The fermentation liquor and mycelia may be separated and then separately extracted with suitable solvents. The mycelia may be extracted with either water-miscible or water-immiscible solvents, acetone being effective. The fermentation liquor, freed of mycelia, may be extracted with water-immiscible solvents. The extracts can be combined, either before or after washing with an alkaline solution, illustratively sodium bicarbonate, suitably dried, as for example over anhydrous sodium sulfate, and the purified fermented steroid obtained by recrystallization from organic solvents or by chromatography.

The 17-hydroxysteroids producible by the process of this invention are useful as chemical intermediates as well as for their physiological activity per se. They possess antifungal and emulsifying and coupling properties of advantage in retarding fungus growth and in stabilizing emulsions where lipophilic agents have heretofore been used.

The following examples are illustrative of the process of the present invention and are not to be construed as limiting.

EXAMPLE 1

A medium having a composition of twelve grams of corn steep solids and ten grams of glucose diluted to one liter with tap water was adjusted to a pH of 4.5 and sterilized by heat. A twelve liter porter of this medium was inoculated with spores of *Trichothecium roseum* Link NRRL 1665 (synonymous with *Cephalothecium roseum* ATCC 8685) and grown under agitation and aeration at a rate of 0.5 liter per minute for a period of 48 hours. Then 4.8 grams of 11-desoxycorticosterone 21-acetate dissolved in 150 milliliters of acetone was added and the fermentation conditions were continued for 48 hours. At that time the beer had a pH of 5.85. Both the beer and mycelium were extracted four times, each time with three liters of methylene chloride. The methylene chloride extracts were combined and washed twice, each time with one-tenth by volume portions of a two percent aqueous solution of sodium bicarbonate, and then twice with one-tenth by volume portions of water. The methylene chloride extract was dried with anhydrous sodium sulfate and then concentrated to a small volume upon a steam bath to leave 7.65 grams of oily residue.

The residue was redissolved in 500 milliliters of ethylene dichloride and chromatographed over 400 grams of Florisil synthetic magnesium silicate using 650-milliliter portions of eluting solvent as indicated in Table I.

*Chromatographic analysis, Table I*

| Fraction | Solvent | Eluate Solids, Milligrams |
| --- | --- | --- |
| 1 | ethylene dichloride | 544.2 |
| 2 | do | 318.2 |
| 3 | ethylene dichloride-acetone 15:1 | 446.8 |
| 4 | do | 42. |
| 5 | ethylene dichloride-acetone 12:1 | 87.4 |
| 6 | do | 81.5 |
| 7 | do | 50.7 |
| 8 | ethylene dichloride-acetone 10:1 | 33.7 |
| 9 | do | 27.9 |
| 10 | ethylene dichloride-acetone 8:1 | 27.6 |
| 11 | do | 26.7 |
| 12 | do | 46.9 |
| 13 | ethylene dichloride-acetone 5:1 | 63.5 |
| 14 | do | 153.2 |
| 15 | do | 142.4 |
| 16 | ethylene dichloride-acetone 3:1 | 236.2 |
| 17 | do | 213.8 |
| 18 | ethylene dichloride-acetone 1:1 | 541.9 |
| 19 | do | 259.7 |
| 20 | acetone | 272.8 |

Eluate solids, fractions 12 through 15 inclusive, were combined, dissolved in sixty milliliters of ethylene chloride and rechromatographed over 35 grams of Florisil synthetic magnesium silicate, using as eluting solvents two portions of 35 milliliters each of the following solvents in their respective order: ethylene dichloride, ethylene dichloride-acetone 12:1, 10:1, 8:1, 5:1, 1:1, and one acetone fraction. The first ethylene dichloride-acetone 1:1 fraction eluted 118 milligrams of crystals primarily consisting of 6β, 17α, 21-trihydroxy-4-pregnene-3,20-dione. Two recrystallizations from methanol produced 26.5 milligrams of 6β,17α,21-trihydroxy-4-pregnene-3,20-dione having a melting point of 229 to 233 degrees centigrade. The infrared spectrum confirmed the structure.

Eluate solids, fractions 16 through 20 inclusive, were combined, redissolved in 100 milliliters of ethylene dichloride, and rechromatographed over 125 grams of Florisil synthetic magnesium silicate, using as eluting solvents 220-milliliter portions of solvents in the following order: ethylene dichloride, ethylene dichloride-acetone 8:1 twice, ethylene dichloride-acetone 5:1 twice, ethylene dichloride-acetone 3:1 three times, ethylene dichloride-acetone 2:1 three times, ethylene dichloride-acetone 1:1, and acetone twice. The second ethylene dichloride-acetone 1:1 eluate was evaporated to yield 84.8 milligrams of an oil which was then crystallized from ether-acetone. The crystals were separated by decanting and then recrystallized once from 0.5 milliliter of methanol to give 15.5 milligrams of crystals of 11α,17α,21-trihydroxy-4-pregnene-3,20-dione having a melting point of 206 to 211 degrees centigrade and characteristic identifying infrared spectrum.

EXAMPLE 2

Following the procedure in Example 1, using progresterone as the starting steroid, in place of desoxycorticosterone 21-acetate, produced the corresponding 17α-hydroxyprogesterone.

EXAMPLE 3

Following the procedure in Example 1, using 11-ketoprogesterone as the starting steroid produced the corresponding 11-keto-17α-hydroxyprogesterone.

EXAMPLE 4

Following the procedure in Example 1, using 11β-hydroxyprogesterone as the starting steroid produced the corresponding 11β,17α-dihydroxyprogesterone.

EXAMPLE 5

Following the procedures of Examples 1, 2, 3 and 4, the same respective results were obtained upon replacing the nutrient medium of Example 1 by twelve liters of a medium made of forty grams of glucose, fifteen grams of starch, five grams of ammonium nitrate, three grams of ethylamine, one gram of potassium phosphate ($KH_2PO_4$), 0.5 gram of magnesium sulfate $(MgSO_4 \cdot 7H_2O)$ 0.01 gram of ferrous sulfate ($FeSO_4 \cdot 7H_2O$), 0.01 gram of zinc sulfate ($ZnSO_4 \cdot 7H_2O$), 0.01 gram of manganese sulfate ($MnSO_4 \cdot 4H_2O$), 0.01 gram of cupric sulfate ($CuSO_4 \cdot 5H_2O$), 0.02 gram of cobalt nitrate $(Co(NO_3)_2 \cdot 6H_2O)$ and 0.01 gram of sodium fluoride (NaF) diluted to one liter with Kalamazoo tap water and adjusted to a pH of 5.

EXAMPLE 6

Following the procedures of Examples 1, 2, 3 and 4, the same respective results were obtained by replacing the nutrient medium of Example 1 by twelve liters of a medium made of two grams of ammonium tartrate, one gram of potassium phosphate ($K_2HPO_4$), 0.5 gram of potassium chloride (KCl), 0.5 gram of magnesium sulfate ($MgSO_4 \cdot 7H_2O$), 0.1 gram of ferrous sulfate, fifty grams of glucose and ten grams of corn-steep liquor diluted to one liter with tap water and adjusted to a pH of 4 with phosphoric acid.

EXAMPLE 7

In Examples 1, 2, 3 and 4, replacing the nutrient medium by twelve liters of a medium of fifteen grams of yeast autolyzate and ten grams of sucrose diluted to one liter with tap water, produced the corresponding respective results.

EXAMPLE 8

In the preceding Examples 1 to 7, inclusive, the fungus *Cephalothecium roseum* can be replaced by strains of each of *Trichothecium candidum*, *Trichothecium plasmoparae*, *Trichothecium polybrochum* or *Trichothecium arrhenopum* to obtain 17-hydroxylation. Likewise the 17-hydroxylation illustrated in Examples 1 to 7, inclusive, is obtained in accordance with the procedure of Examples 1 to 7, inclusive, by replacing the fungus *Cephalothecium roseum* ATCC 8685 by *Trichothecium luteum* Petch, Strain Boedijn and Reitsma (C.B.S.); *Trichothecium domesticum* Fr. (C.B.S.); *Trichothecium roseum* Link (C.B.S.); *Trichothecium roseum* Link (with pseudoverticillium form) (C.B.S.); *Trichothecium cystosporium* Duddingtor, Duddington strain (C.B.S.); and *Trichothecium roseum* Link, Cain strain (C.B.S.).

EXAMPLE 9

A medium was prepared of fifty grams of cerelose dextrose, two grams of $KH_2PO_4$, 0.5 gram of $MgSO_4$, 0.3 gram of $ZnSO_4$, 0.35 gram of $K_2SO_4$, 7.5 grams of yeast extract diluted to one liter with tap water and adjusted to a pH of 5.7. Twelve liters of this sterilized medium was inoculated with *Trichothecium roseum* (*Cephalothecium roseum*) and incubated aeration for 72 hours. Then six grams of progesterone dissolved in 200 milliliters of ethanol was added to the culture and fermentation with aeration was continued for 48 hours.

Extraction of the beer, containing mycelium, with methylene dichloride gave ten grams of an oily residue, an aliquot of which was separated by paper chromatography to give 11α,17α-dihydroxyprogesterone.

The oily residue was dissolved in 300 milliliters of ethylene dichloride and chromatographed over 480 grams of Florisil synthetic magnesium silicate using 700-milliliter portions of solvent in accordance with Table II. Solid fractions 11 through 14, inclusive, were triturated with ether, the mother liquors were decanted, and the crystalline residues were combined and recrystallized twice from ten milliliters of methanol to yield 426 milligrams of 11α,17α-dihydroxyprogesterone having a melting point of 218 to 222 degrees centigrade and an optical rotation $[\alpha]_D$ of plus 74 degrees (concentration of 0.98 in chloroform), and characteristic infrared spectrum.

Table II

| Fraction | Solvent | Eluate Solids, Milligrams |
| --- | --- | --- |
| 1 | ethylene dichloride | 789 |
| 2 | do | 215 |
| 3 | ethylene dichloride-acetone 25:1 | 755 |
| 4 | do | 187 |
| 5 | ethylene dichloride-acetone 15:1 | 90 |
| 6 | do | 105 |
| 7 | ethylene dichloride-acetone 12:1 | 531 |
| 8 | do | 615 |
| 9 | do | 315 |
| 10 | ethylene dichloride-acetone 10:1 | 489 |
| 11 | do | 412 |
| 12 | do | 285 |
| 13 | ethylene dichloride-acetone 8:1 | 395 |
| 14 | do | 295 |

EXAMPLE 10

Following the process of Example 9, using 11-dehydrocorticosterone in place of progesterone, fermentation and methylene dichloride extraction gave 7.35 grams of an oily extract. This extract was dissolved in 300 milliliters of ethylene dichloride and chromatographed over 320 grams of Florisil synthetic magnesium silicate using 490-milliliter portions of solvents in accordance with Table III. Solids from fractions 15, 16 and 17 were combined and recrystallized twice from acetone to give 216.5 milligrams of cortisone.

Table III

| Fraction | Solvent | Eluate Solids, Milligrams |
| --- | --- | --- |
| 1 | ethylene dichloride | 635.5 |
| 2 | do | 178.5 |
| 3 | ethylene dichloride-acetone 15:1 | 255.5 |
| 4 | do | 89.5 |
| 5 | ethylene dichloride-acetone 12:1 | 55.0 |
| 6 | do | 26.5 |
| 7 | ethylene dichloride-acetone 10:1 | 15.5 |
| 8 | do | 67.0 |
| 9 | ethylene dichloride-acetone 8:1 | 221.5 |
| 10 | do | 289.0 |
| 11 | do | 263.5 |
| 12 | ethylene dichloride-acetone 5:1 | 512.0 |
| 13 | do | 501.5 |
| 14 | do | 368.0 |
| 15 | ethylene dichloride-acetone 3:1 | 478.5 |
| 16 | do | 211.0 |
| 17 | do | 206.0 |

EXAMPLE 11

Following the process of Example 9, using corticosterone 11β,21-dihydroxy-4-pregnene-3,20-dione), in place of progesterone, produced 17-hydroxycorticosterone (11β,17α,21-trihydroxy-4-pregnene-3,20-dione) and cortisone (17α,21-dihydroxy-4-pregnene-3,11,20-trione).

EXAMPLE 12

Following the process of Example 9, using 17α,21-dihydroxy-4-pregnene-3,20-dione, in place of progesterone, produced 11α,17α,21-trihydroxy-4-pregnene-3,20-dione.

It is to be understood that the invention is not limited to the exact details of operation or exact species of fungus or compounds shown and described, as obvious modifications and equivalents will be apparent to one skilled in the art and the invention is therefore to be limited only by the scope of the appended claims.

We claim:

1. A process for hydroxylating a steroid which includes the introduction of an α-hydroxy group at position 17 of a steroid which comprises growing a species of fungus of the genus Trichothecium under aerobic conditions in an aqueous medium, containing a steroid having a tertiary hydrogen attached to the carbon atom at position 17.

2. A process for the biological introduction of a 17α-hydroxyl group into a steroid which comprises growing a species of fungus of the genus Trichothecium under aerobic conditions in an aqueous medium containing a steroid having a tertiary hydrogen attached to the carbon atom at position 17 and recovering the resulting 17α-hydroxylated steroid.

3. A process for the introduction of oxygen into a steroid which comprises growing a species of fungus of the genus Trichothecium under agitated aerobic conditions in a nutrient medium containing a non-steroidal source of assimilable carbon and a steroid having a 17-tertiary hydrogen and having up to and including 22 carbon atoms in the carbon-to-carbon skeleton and recovering the resulting 17α-hydroxylated steroid.

4. A process for the introduction of oxygen into a steroid which comprises growing a species of fungus of the genus Trichothecium under agitated aerobic conditions in a nutrient medium containing assimilable phosphate and carbohydrate and a steroid having a 17-tertiary hydrogen and a two carbon atom side chain attached to the 17 position and recovering the resulting 17α-hydroxylated steroid.

5. A process for the introduction of oxygen into a steroid which comprises growing a species of fungus of the genus Trichothecium under agitated aerobic conditions in a nutrient medium containing assimilable phosphate, non-steroidal carbon and a steroid having a 17-tertiary hydrogen, a two carbon atom side chain attached to the 17-position and a 20-keto group and recovering the resulting 17α-hydroxylated steroid.

6. A process for the introduction of a 17α-hydroxyl group into a steroid which comprises growing a species of fungus of the genus Trichothecium under agitated aerobic conditions in a nutrient medium containing assimilable phosphate, non-steroidal carbon and a steroid having the structure:

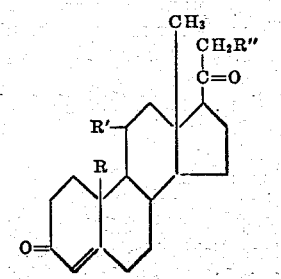

wherein R is selected from the group consisting of hydrogen and methyl, R' is selected from the group consisting of hydrogen, α-hydroxyl, β-hydroxyl, and ketonic oxygen, and R" is selected from the group consisting of hydrogen, hydroxyl and aceyloxy, and recovering the resulting 17α-hydroxylated steroid.

7. A process for the introduction of oxygen into a 17-acetyl-17-tertiary hydrogen steroid which comprises growing a species of fungus of the genus Trichothecium under agitated aerobic conditions in a nutrient medium containing assimilable phosphate and carbohydrate and said steroid and recovering the resulting 17α-hydroxylated steroid.

8. A process for the production of 17α-hydroxyprogesterone which comprises growing a species of fungus of the genus Trichothecium under aerobic conditions in a nutrient medium containing progesterone and recovering the resulting 17α-hydroxyprogesterone.

9. A process for producing 11-keto-17α-hydroxyprogesterone which comprises growing a species of fungus of the genus Trichothecium under aerobic conditions in a nutrient medium containing 11-ketoprogesterone and recovering the resulting 11-keto-17α-hydroxyprogesterone.

10. A process for producing 11α,17α-dihydroxyprogesterone which comprises growing a species of fungus of the genus Trichothecium under aerobic conditions in a nutrient medium containing 11α-hydroxyprogesterone and recovering the resulting 11α,17α-dihydroxyprogesterone.

11. A process for producing 11β,17α-dihydroxyprogesterone which comprises growing a species of fungus of the genus Trichothecium under aerobic conditions in a nutrient medium containing 11β-hydroxyprogesterone and recovering the resulting 11β,17α-dihydroxyprogesterone.

12. A process for the introduction of oxygen into a 17-glycolylsteroid which comprises growing a species of fungus of the genus Trichothecium under agitated aerobic conditions in a nutrient medium containing assimilable phosphate and carbohydrate and said steroid and recovering the resulting 17α-hydroxylated steroid.

13. A process for the introduction of oxygen into a 17-(21-acyloxy)-acetyl-steroid which comprises growing a species of fungus of the genus Trichothecium under agitated aerobic conditions in a nutrient medium containing assimilable phosphate, a carbohydrate and said steroid and recovering the resulting 17α-hydroxylated steroid.

14. A process for producing cortisone-21-ester which comprises growing a species of fungus of the genus Trichothecium under aerobic conditions in a nutrient medium containing 17-desoxycorticosterone-21-ester and recovering the resulting cortisone-21-ester.

15. A process for producing an oxygenated steroid comprising growing Trichothecium roseum under aerobic conditions in a nutrient medium containing a steroid having a tertiary hydrogen attached to the carbon atom at position 17, a two carbon atom side chain attached to position 17, and a 20-keto group and recovering the resulting 17α-hydroxylated steroid.

16. A process for hydroxylating a steroid which includes the introduction of an α-hydroxy group at position 17 of a steroid which comprises growing Trichothecium roseum under aerobic conditions in an aqueous medium, containing a steroid having a tertiary hydrogen attached to the carbon atom at position 17.

17. A process for the production of 17α-hydroxyprogesterone which comprises growing Trichothecium roseum under aerobic conditions in a nutrient medium containing progesterone and recovering the resulting 17α-hydroxyprogesterone.

18. A process for producing 11-keto-17α-hydroxyprogesterone which comprises growing Trichothecium roseum under aerobic conditions in a nutrient medium containing 11-ketoprogesterone and recovering the resulting 11-keto-17α-hydroxyprogesterone.

19. A process for producing 11α,17α-dihydroxyprogesterone which comprises growing Trichothecium roseum under aerobic conditions in a nutrient medium containing 11α-hydroxyprogesterone and recovering the resulting 11α,17α-dihydroxyprogesterone.

20. A process for producing 11β,17α-dihydroxyprogesterone which comprises growing Trichothecium roseum under aerobic conditions in a nutrient medium containing 11β-hydroxyprogesterone and recovering the resulting 11β,17α-dihydroxyprogesterone.

21. A process for producing cortisone-21-ester which comprises growing Trichothecium roseum under aerobic conditions in a nutrient medium containing 17-desoxycorticosterone-21-ester and recovering the resulting cortisone-21-ester.

References Cited in the file of this patent

UNITED STATES PATENTS

| 2,602,769 | Murray et al. | July 18, 1952 |
| 2,658,023 | Shull et al. | Nov. 3, 1953 |

OTHER REFERENCES

Ainsworth et al.: Dictionary of the Fungi, Commonwealth Mycological Institute, Kew, Surrey, 1954, pp. 63, 362.

Bessey: Morphology and Taxonomy of Fungi, 1950, The Blakiston Co., Philadelphia, pp. 15 to 18.

Eppstein et al.: Vitamins and Hormones, vol. XIV, 1956, p. 391.